United States Patent
Woolfson (10) Patent No.: US 10,080,268 B2
(45) Date of Patent: Sep. 18, 2018

(54) STROBOSCOPE WITH INTEGRAL OPTICAL REFLECTIVE SENSOR USED AS A FLASH TRIGGER

(71) Applicant: Alan J Woolfson, Amherst, NH (US)

(72) Inventor: Alan J Woolfson, Amherst, NH (US)

( * ) Notice: Subject to any disclaimer, the term of this patent is extended or adjusted under 35 U.S.C. 154(b) by 0 days.

(21) Appl. No.: 15/443,952

(22) Filed: Feb. 27, 2017

(65) Prior Publication Data
US 2017/0261372 A1    Sep. 14, 2017

Related U.S. Application Data

(60) Provisional application No. 62/305,771, filed on Mar. 9, 2016.

(51) Int. Cl.

| G01J 1/44 | (2006.01) |
|---|---|
| H05B 33/08 | (2006.01) |
| G01P 3/40 | (2006.01) |
| F21S 10/06 | (2006.01) |
| G01S 17/50 | (2006.01) |
| G01J 1/42 | (2006.01) |

(52) U.S. Cl.
CPC .......... H05B 33/0854 (2013.01); F21S 10/06 (2013.01); G01P 3/40 (2013.01); G01S 17/50 (2013.01); *G01J 2001/4238* (2013.01); *G01J 2001/4473* (2013.01)

(58) Field of Classification Search
CPC ........ H05B 33/0854; F21S 10/06; G01P 3/40; G01S 17/50; G01N 2021/1791; G01J 2001/4238; G01J 2001/4473
See application file for complete search history.

(56) References Cited

U.S. PATENT DOCUMENTS

| 3,412,602 | A | * | 11/1968 | Rush | F02D 41/40 |
|---|---|---|---|---|---|
| | | | | | 73/114.49 |
| 4,413,181 | A | * | 11/1983 | Feuerbaum | H01J 37/045 |
| | | | | | 250/310 |
| 2004/0264181 | A1 | * | 12/2004 | Woolfson | G01P 3/40 |
| | | | | | 362/157 |
| 2007/0159618 | A1 | * | 7/2007 | Woolfson | G01S 17/50 |
| | | | | | 356/27 |
| 2015/0160341 | A1 | * | 6/2015 | Akatsu | H05B 37/0227 |
| | | | | | 356/23 |

* cited by examiner

*Primary Examiner* — Dominic J Bologna (57) ABSTRACT

A stroboscope with an integral optical reflective sensor, which can be removable or fixed, contains a light emitting source, a light sensitive receiver, a pulse conditioning circuit, a stroboscope circuit, a blanking circuit, and a stroboscope light source. The light emitting source projects a light beam to a reflective target. The reflected light beam from the reflective target is detected by the light sensitive receiver. The pulse conditioning circuit generates a set of electrical pulses coincident with the reflected light beam which are sent to the stroboscope circuit. Depending on the signal received by the stroboscope circuit, the stroboscope light source is triggered. The blanking circuit prevents false triggering of the stroboscope light source by introducing a time delay. The time delay is applied when the stroboscope light source is switched on and for a finite time after the stroboscope light source is switch off.

14 Claims, 10 Drawing Sheets

STROBOSCOPE WITH INTEGRAL OPTICAL REFLECTIVE SENSOR USED AS A FLASH TRIGGER

The current application claims a priority to the U.S. Provisional Patent application Ser. No. 62/305,771 filed on Mar. 9, 2016.

FIELD OF THE INVENTION

The present invention relates generally to the field of visual inspection to stop motion. More specifically, the present invention is an optical sensor integrated into a stroboscope allowing a user to synchronize the stroboscope flash to specific events on a rotating or vibrating target. The optical sensor is used as a trigger for the flash when the stroboscope is in use. The optical sensor may be fixed to the stroboscope or may be removable to be used remotely.

BACKGROUND OF THE INVENTION

Stroboscopes are used in the industry to stop motion and allow inspection of reciprocating or rotating machinery or to determine the rate of reciprocation or speed of rotation. The typical mode of operation is asynchronous whereby the operator manually adjusts the flash rate until the moving target appears to be visually static. Unless the machine is running at a constant rate, the operator is required to continuously adjust the settings of the stroboscope to maintain the stop motion.

An alternate method is to trigger the stroboscope synchronously using an external pulse generated from the reciprocating/rotating machine. This method requires the machine to be pre-fitted with some form of encoder or mechanical device to provide the synchronous pulse.

Another method involves the use of an external reflective optical sensor which emits a light beam at the target, the reciprocating/rotating machine which has a reflective target attached or some other physical feature (such as a keyway on a shaft) which acts as a reflective target. The light is reflected by the target and sensed by the optical sensor which then generates a pulse to trigger the stroboscope flash. Unless the stroboscope has special blanking capability, the stroboscope flash will cause the optical sensor to re-trigger which will cause another flash and so on, leading to unstable operation. If a portable stroboscope uses an external sensor, then the user needs two hands to separately operate the portable stroboscope and the external sensor or the user needs to mount the external sensor on a tripod. The cabling of the sensor to the stroboscope and its accessories may pose a danger around moving machinery.

The objective of the present invention is to address the aforementioned issues. In particular, the present invention introduces a stroboscope with an integrated optical sensor. The optical sensor helps trigger the stroboscope as required. Moreover, the user only needs one hand to operate the stroboscope since the optical sensor is integrated into the stroboscope. A feature of the optical sensor is that it may be removed for remote operation.

DETAIL DESCRIPTIONS OF THE INVENTION

All illustrations of the drawings are for the purpose of describing selected versions of the present invention and are not intended to limit the scope of the present invention.

The present invention is configured to address multiple drawbacks of existing stroboscopes. As an example, the present invention eliminates the need to continuously adjust the flash rate of the stroboscope until the target appears to be still. The present invention provides an apparatus in which an optical sensor is integrated into a stroboscope so that the stroboscope can be used to study periodic motion without the need for manually adjusting the stroboscope. The optical sensor and the stroboscope operate as a single assembly. Therefore, the present invention also enables one-handed operation which is not possible with traditional stroboscopes that function with an external optical sensor. Additionally, the present invention utilizes a filtering and conditioning circuitry to extract a valid trigger from the reflected light source.

Figure 1:
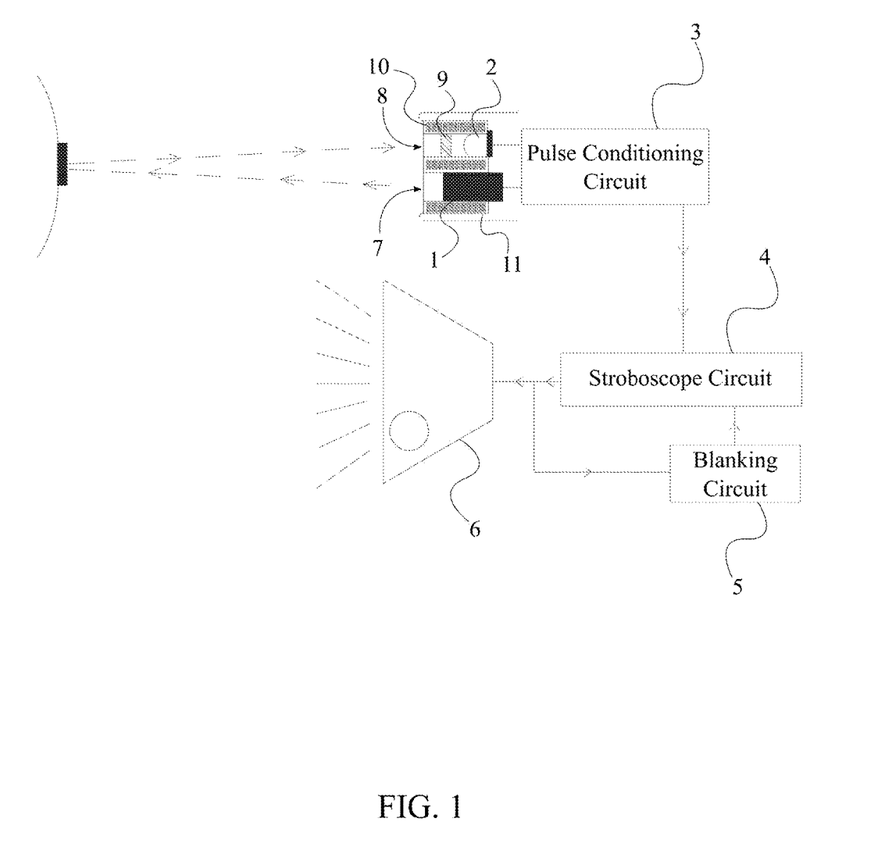
FIG. 1 is a block diagram illustrating the present invention.

As illustrated in FIG. 1, the present invention comprises a light emitting source 1, a light sensitive receiver 2, a pulse conditioning circuit 3, a stroboscope circuit 4, a blanking circuit 5, and a stroboscope light source 6. The light emitting source 1, the light sensitive receiver 2, and the pulse conditioning circuit 3 function as components of the optical sensor. The light emitting source 1 and the light sensitive receiver 2 are mounted coplanar to each other within an optical block 10 of the present invention. The light emitting source 1, which can vary in different embodiments of the present invention, is used to project a light beam on to a reflective target on a rotating or reciprocating object. The reflective target would be positioned on the rotating or reciprocating object in which the speed needs to be determined, or the apparent motion needs to be virtually stopped for inspection purposes. In the preferred embodiment of the present invention, a laser beam is used as the light emitting source 1 so that the light can be emitted over a considerable distance from the light emitting source 1. However, a different source such as a light emitting diode (LED) can also be used as the light emitting source 1 in other embodiments of the present invention.

When the emitted light hits the reflective target, the light beam is reflected towards the light sensitive receiver 2. This reflected light beam is then used to trigger the stroboscope as required. The light sensitive receiver 2 is used to detect the reflected light beam. In the preferred embodiment of the present invention, the light sensitive receiver 2 is a phototransistor. However, in another embodiment of the present invention, a photodiode or another comparable device can also be used as the light sensitive receiver 2. In order to properly receive the reflected light beam, the light emitting source 1 is positioned adjacent and coplanar with the light sensitive receiver 2 so that the light sensitive receiver 2 is able to gather a larger proportion of the reflected light beam. When the reflected light beam is received, the reflected light beam needs to be processed to trigger the stroboscope light source 6.

The pulse conditioning circuit 3 generates an electrical pulse corresponding to the reflected light beam and initiates an electric signal which will be ultimately used to trigger the stroboscope light source 6. To do so, the light sensitive receiver 2 is electronically connected to the pulse conditioning circuit 3. When the pulse conditioning circuit 3 receives the input signal corresponding to the reflected light beam, the pulse conditioning circuit 3 amplifies and filters the input signal and subsequently produces an output signal to trigger the stroboscope circuit 4. In order to do so, the pulse conditioning circuit 3 is electronically connected to the stroboscope circuit 4. The stroboscope circuit 4 and blanking circuit 5 control the stroboscope light source 6. To transfer the output signal from the stroboscope circuit 4 to the stroboscope light source 6, the stroboscope circuit 4 is electronically connected to the stroboscope light source 6 which can vary in different embodiments of the present invention. As an example, in the preferred embodiment of the present invention, the stroboscope light source 6 is an LED array. However, in other embodiments of the present invention, the stroboscope light source 6 can be, but is not limited to, a Xenon lamp, or other high intensity light source.

One of the significant disadvantages of existing stroboscopes using external optical sources to trigger the stroboscope, is false triggering. The present invention addresses optical-based false triggering. False triggering mainly occurs when the light from the stroboscope light source 6 is observed by the light sensitive receiver 2 as reflected light from the reflective target. The pulse conditioning circuit 3 processes the false trigger and outputs a signal to illuminate the stroboscope light source 6. The present invention utilizes the blanking circuit 5 to address false triggering. To do so, the blanking circuit 5 consists of discrete electronic components, or can be code executed by a microprocessor. The stroboscope circuit 4 is electronically connected to the blanking circuit 5, which ensures that the stroboscope circuit 4 is completed only when the requirements are met. To do so, the blanking circuit 5 introduces a delay time after the stroboscope light source 6 is fired so that the stroboscope circuit 4 is not enabled for the time defined by the delay time. The delay time ensures that the stroboscope light source 6 is not re-triggered during the time in which the stroboscope light source 6 is switched on. Additionally, the delay time also ensures that the stroboscope light source 6 is not re-triggered for a specified time after the stroboscope light source 6 is switched off.

Figure 10:
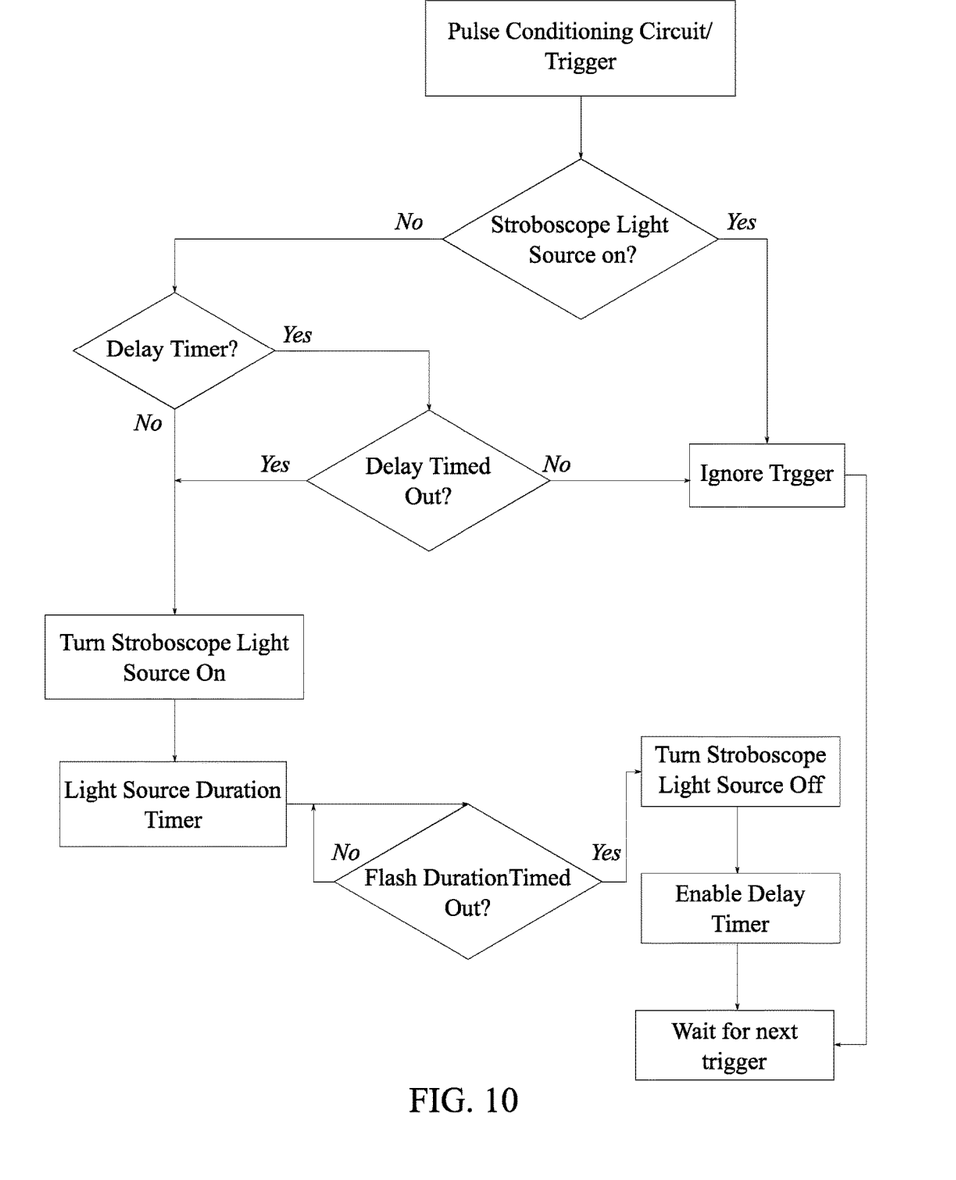
FIG. 10 is a flowchart illustrating the basic overall process of the blanking circuit.

As illustrated in FIG. 10, a general process flow of the blanking circuit 5 is as follows. Initially, an output pulse from the pulse conditioning circuit 3 is received by the blanking circuit 5. When received, the circuitry of the blanking circuit 5 determines if the stroboscope light source 6 is on or off. If the stroboscope light source 6 is on, the output pulse from the pulse conditioning circuit 3 is ignored, until the next trigger event. If the stroboscope light source 6 is off when the output pulse is received, a different operational path is followed. In particular, if the circuitry determines that the stroboscope light source 6 is off, the output signal is transmitted to a trigger delay portion of the blanking circuit 5. If the delay timer is active, the output pulse from the pulse conditioning circuit 3 is ignored until the next triggered event. If the delay timer has timed out, the output pulse for the pulse conditioning circuit 3, is routed to the strobe circuit 4 which turns on the strobe light source 6. Subsequently, a stroboscope flash duration timer is activated by the stroboscope circuit 4. The stroboscope light source 6 remains on until a specific flash time determined by the stroboscope flash duration timer expires. When the specific flash time expires, the stroboscope light source 6 is turned off. When the stroboscope light source 6 is turned off, the delay timer is enabled and the process described earlier is repeated.

Figure 2:
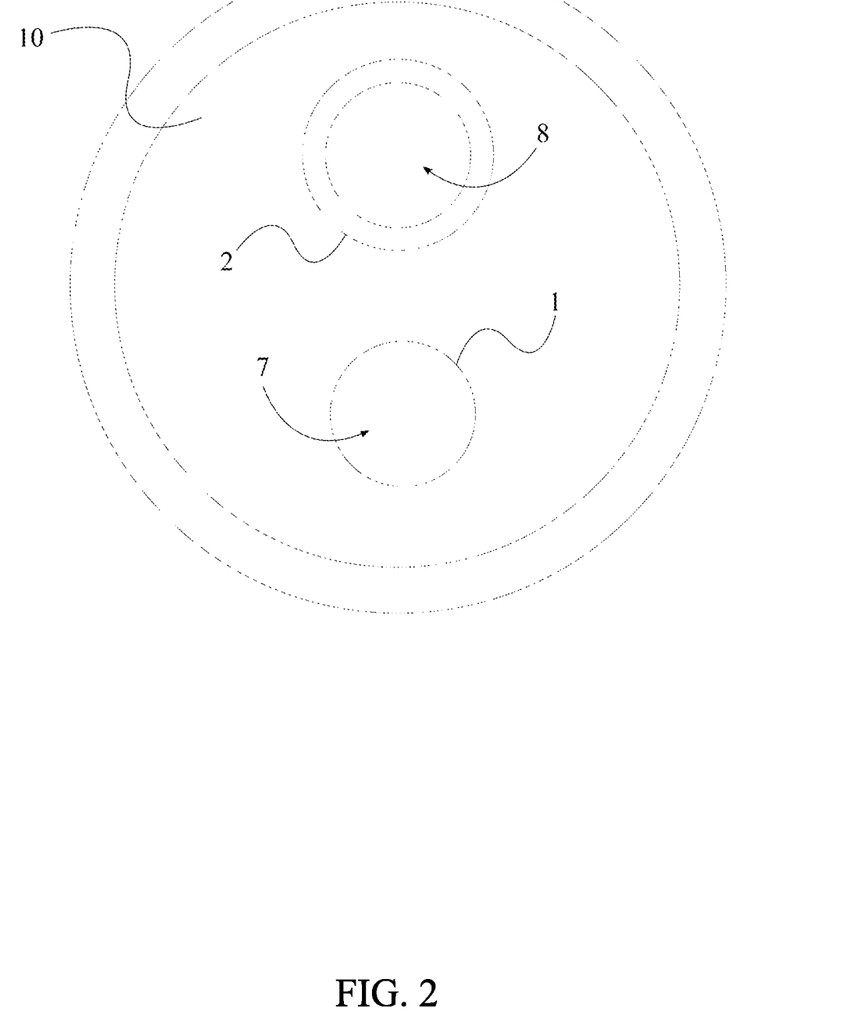
FIG. 2 is a front view illustrating the optical block.

As shown in FIG. 2, the present invention comprises an optical block 10, which is a structural housing for the light emitting source 1 and the light sensitive receiver 2. Thus, the light emitting source 1 and the light sensitive receiver 2 are mounted within the optical block 10. In order to create a clear path for emitting the light beam, the present invention comprises an emitter aperture 7 which traverses out of the optical block 10 and is coplanar and adjacent to the light emitting source 1. In order to create a clear path for the reflected light beam, the present invention comprises a receiving aperture 8, which traverses into the optical block 10 and is coplanar and adjacent to the light sensitive receiver 2 as seen in FIG. 1. The close coplanar situation between the emitter aperture 7 and the receiving aperture 8 maximizes the reception of reflected light from the target.

The receiving aperture 8 guides the reflected light beam towards the light sensitive receiver 2. However, the reflected light beam consists of reflected light and ambient light. Ambient light masks the reflective signal by overloading the light sensitive receiver 2. To obtain accurate results by eliminating ambient light, the present invention comprises an optical bandpass filter 9. Since the light beam directed towards the light sensitive receiver 2 needs to be filtered initially, the optical bandpass filter 9 is mounted adjacent to the light sensitive receiver 2. Due to the positioning of the optical bandpass filter 9, the reflected light passes through the optical bandpass filter 9 before getting to the light sensitive receiver 2. The optical bandpass filter 9 is tuned to only allow light from the light emitting source 1 to pass. Moreover, the optical bandpass filter 9 is in optical communication with the light sensitive receiver 2 and, therefore attenuates all light frequencies except for the reflected light beam that originated from the-light emitting source 1.

Figure 3:
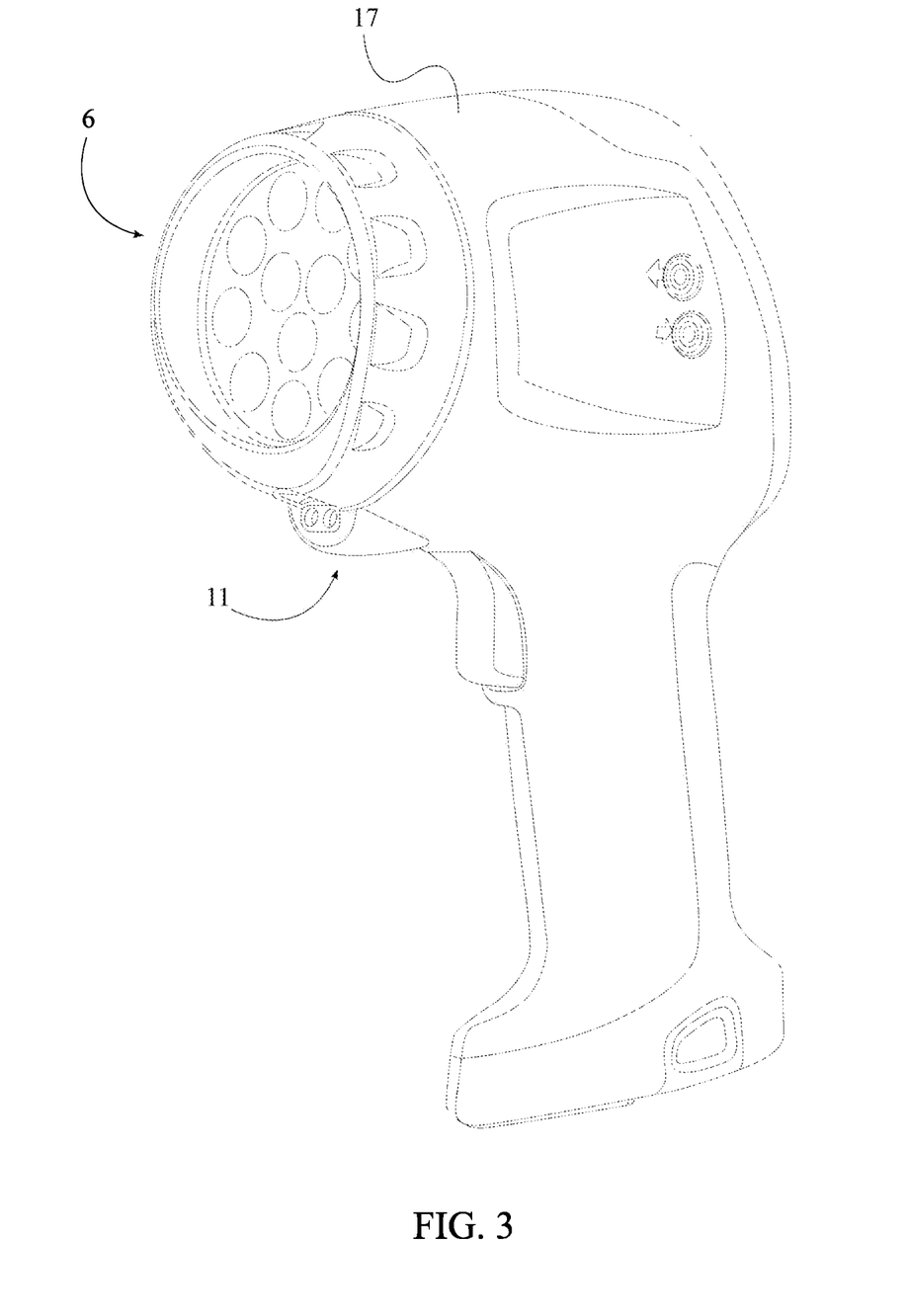
FIG. 3 is a perspective view of the present invention being integrated into a stroboscope.
Figure 4:
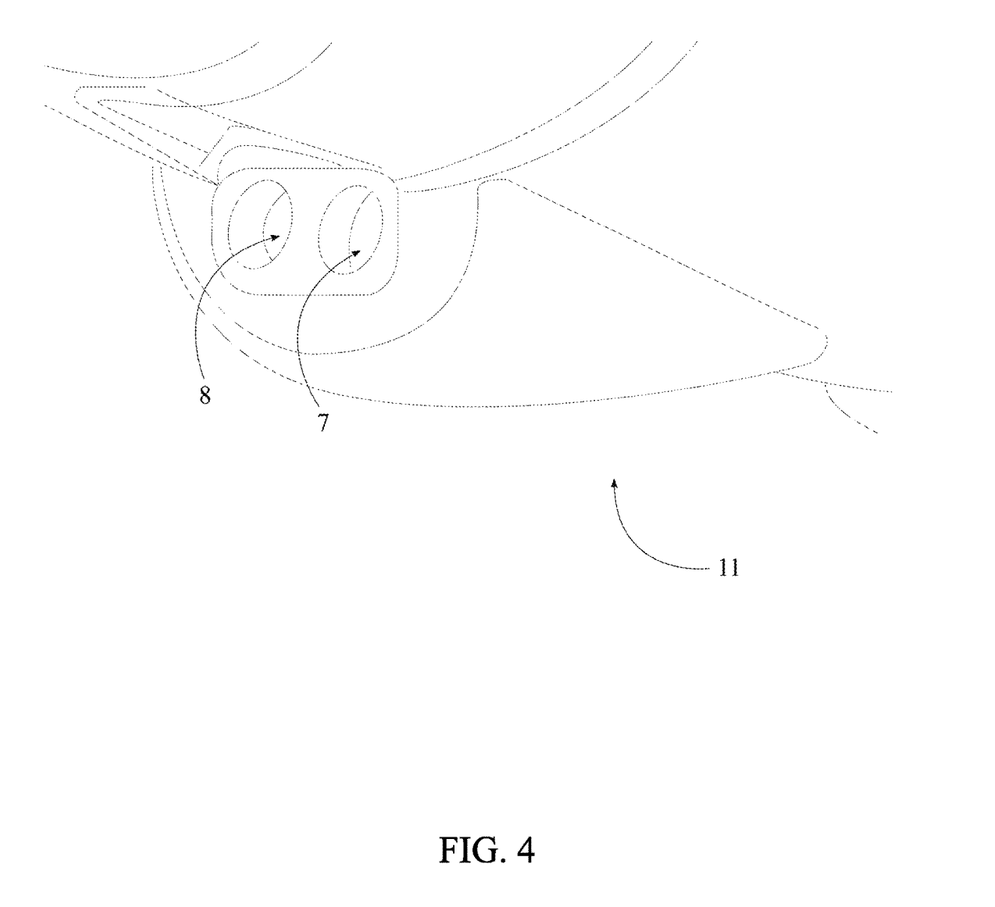
FIG. 4 is a perspective view of the module housing.
Figure 5:
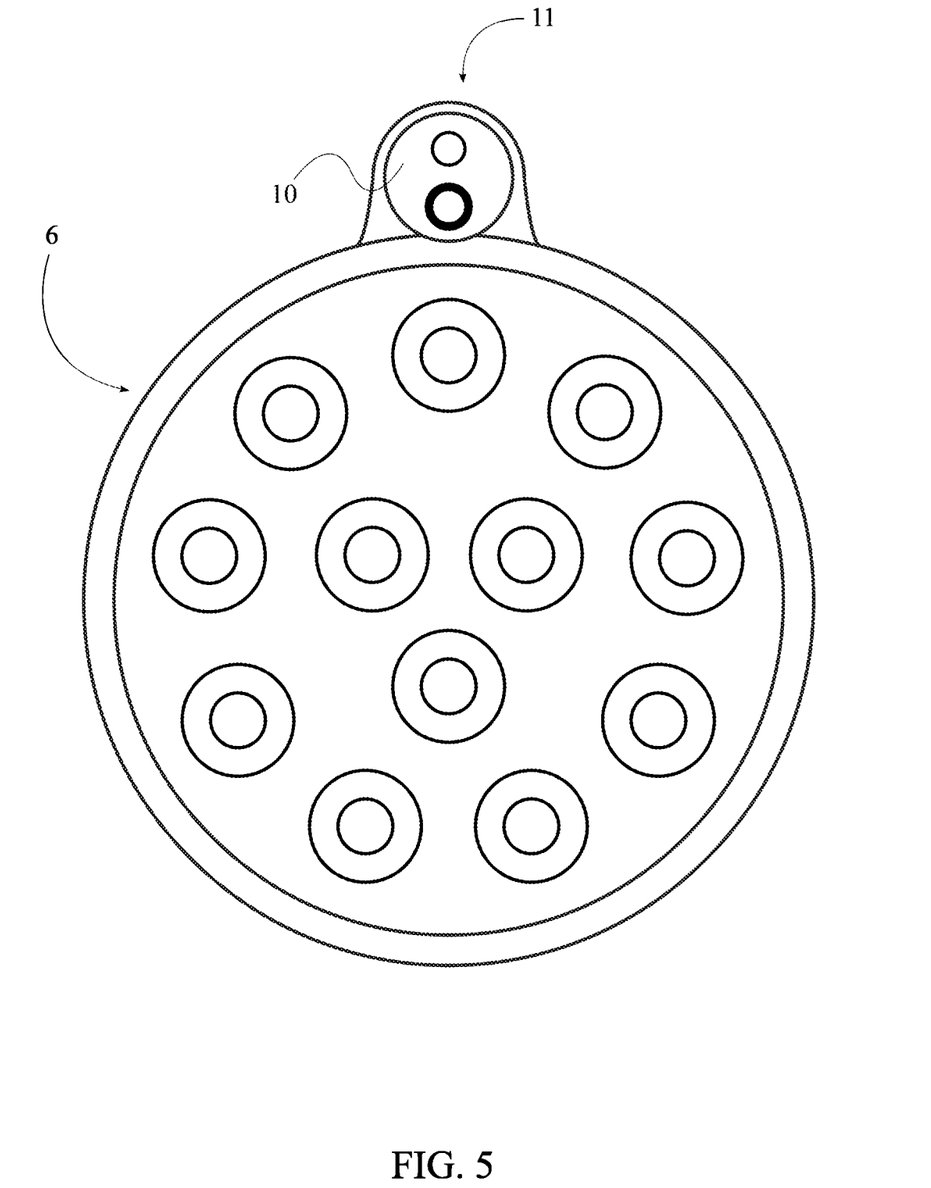
FIG. 5 is a front view of the module housing being peripherally positioned onto the stroboscope light source.
Figure 6:
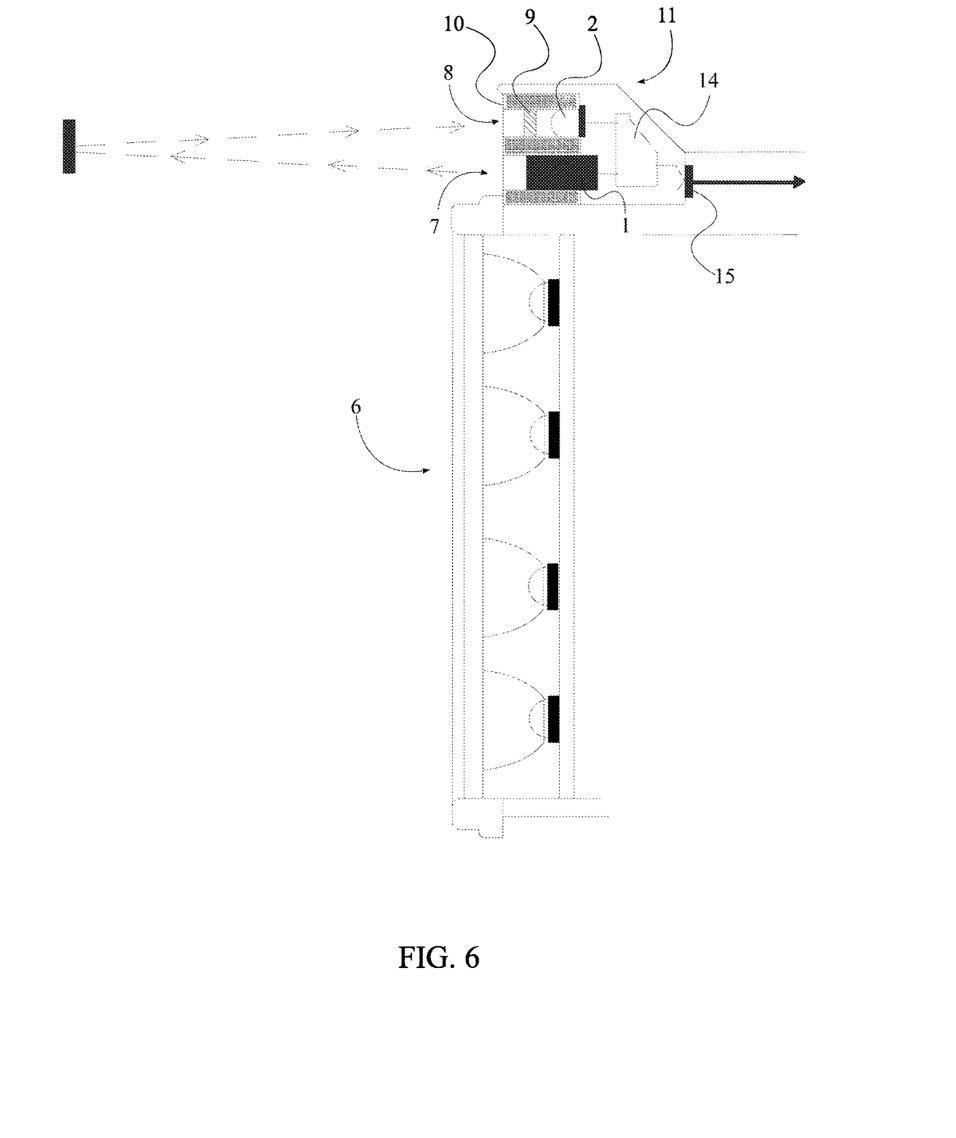
FIG. 6 is a cross-sectional view of the module housing being peripherally positioned onto the stroboscope light source.

The light emitting source 1, the light sensitive receiver 2, and the pulse conditioning circuit 3 can be integrated into the stroboscope differently in varying embodiments of the present invention. As illustrated in FIG. 3 and FIG. 4, the present invention utilizes a module housing 11 and a stroboscope body 17 to hold the light emitting source 1, the light sensitive receiver 2, and the pulse conditioning circuit 3. In addition to holding the components of the optical sensor, the module housing 11 allows the optical sensor to be used as an independent unit. The light emitting source 1, the light sensitive receiver 2, and the pulse conditioning circuit 3 are mounted within the module housing 11 which is then mounted onto the stroboscope body 17. More specifically, the module housing 11 is mounted in the same plane and direction as the stroboscope light source 6. The position and mounting method of the module housing 11 can vary per the need. As illustrated in FIG. 5 and FIG. 6, the module housing 11 can be peripherally positioned to the stroboscope body 17. When peripherally positioned, the module housing 11 is removably attached to the stroboscope body 17 in one embodiment of the present invention. However, when peripherally positioned, the module housing 11 can also be permanently fixed to the stroboscope body 17.

Figure 7:
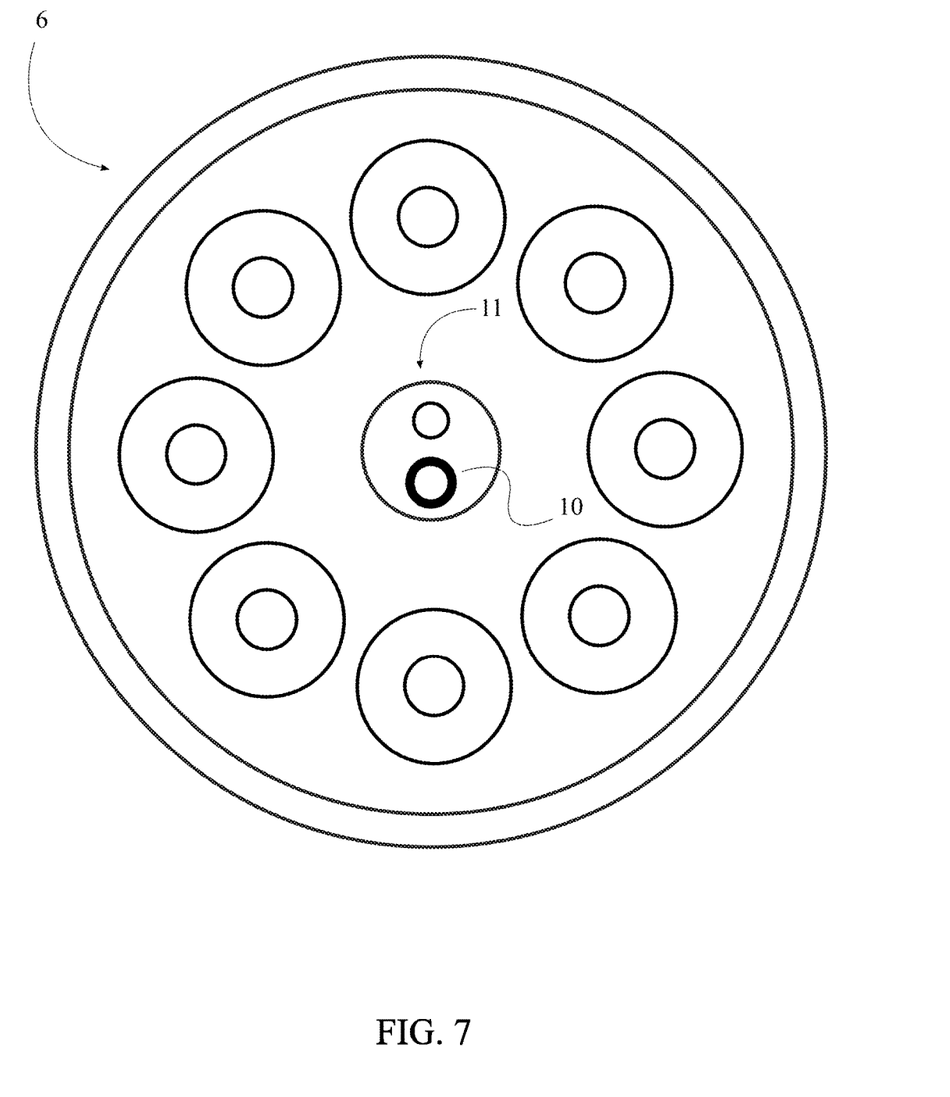
FIG. 7 is a front view of the module housing being centrally positioned onto the stroboscope light source.
Figure 8:
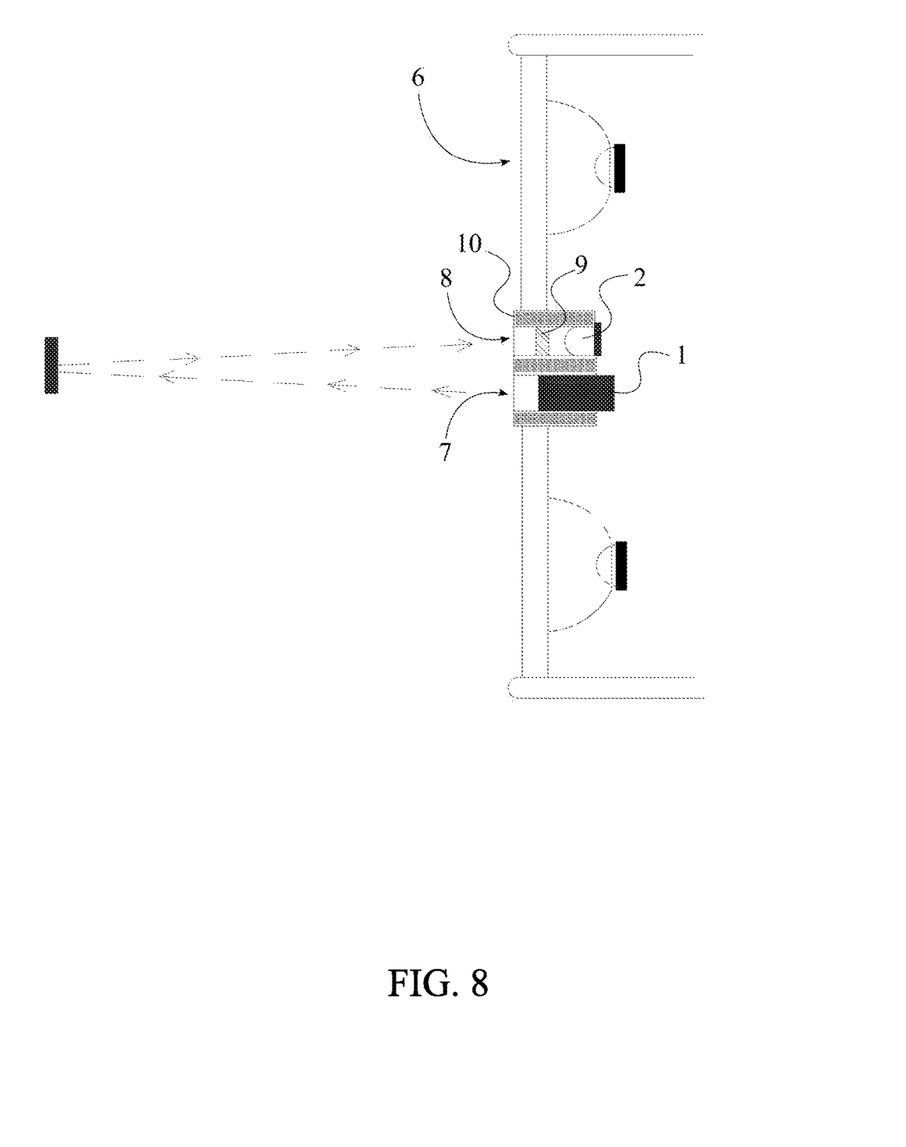
FIG. 8 is a cross-sectional view of the module housing being centrally positioned to the stroboscope light source.

As shown in FIG. 7 and FIG. 8, the module housing 11 can also be centrally positioned to the stroboscope light source 6 in another embodiment of the present invention. When centrally positioned, the module housing 11 is fixed to the stroboscope body 17. In other words, the module housing 11 can be permanently mounted onto the stroboscope body 17.

As seen in FIG. 6, the components within the module housing 11 need to be electronically connected with the stroboscope light source 6. To do so, the present invention comprises an electronic terminal 14 which is mounted into the module housing 11. Furthermore, the present invention further comprises a mating connector 15 which is externally positioned from the module housing 11. More specifically, the mating connector is positioned onto the stroboscope body 17. The stroboscope circuit 4 is electronically connected to the electronic terminal 14 via the mating connector 15. In the preferred embodiment of the present invention, the electronic terminal 14 is a compression connector. However, the electronic terminal 14 can vary in different embodiments of the present invention.

Figure 9:
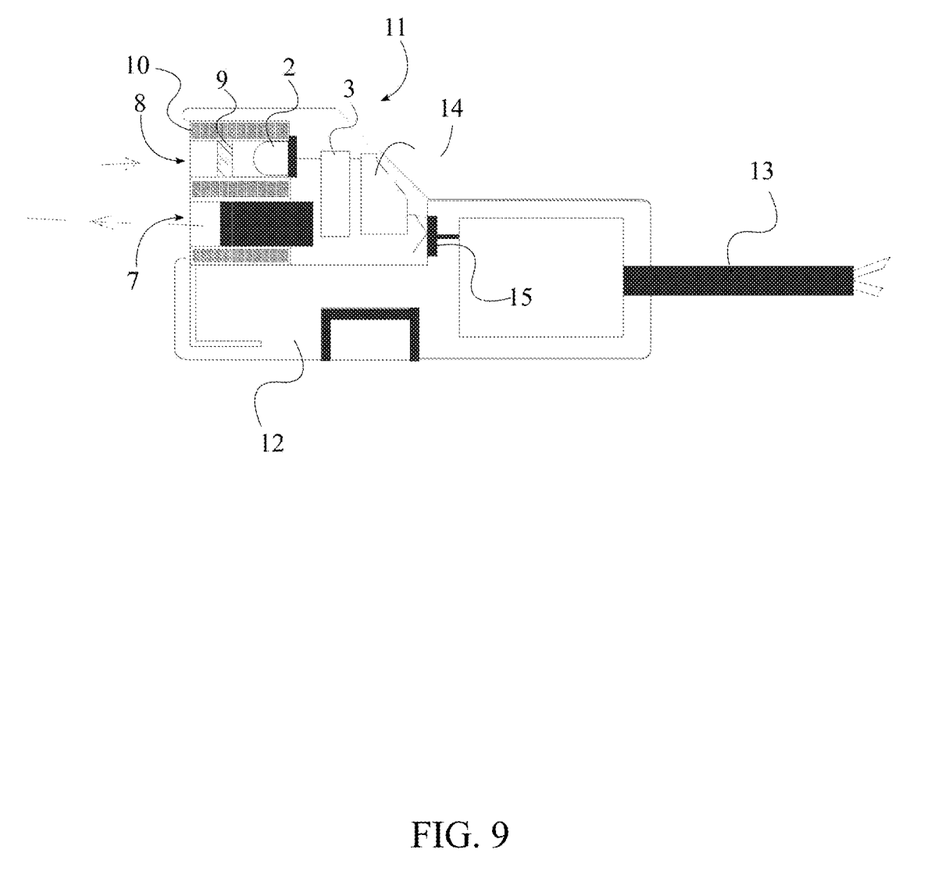
FIG. 9 is a cross-sectional view of the module housing being mounted onto the remote base.

Depending on the target that is being monitored, projecting the light beam from a different angle or remote from the stroboscope might be a necessity. To fulfill this requirement, the present invention comprises a remote base 12, a signal buffer circuit 16, and a signal transmission cable 13. The remote base 12 allows the user to position the module housing 11 separate from the stroboscope body 17. When separate from the stroboscope body 17, the module housing 11 is mounted onto the remote base 12. The signal transmission cable 13 is then used to electronically connect the remote base 12 to the stroboscope light source 6 and the stroboscope body 17. More specifically, the remote base 12 is tethered to the stroboscope light source 6 and stroboscope body 17 through the signal buffer circuit 16. Thus, the pulse conditioning circuit 3 is electronically connected to the stroboscope circuit 4 with the signal transmission cable 13. This allows the module housing 11 to be electronically connected even when physically separated from the stroboscope light source 6.

When utilizing the present invention, the following process flow is generally followed. Initially, the present invention is appropriately positioned in respect to the reflective target. In other words, the present invention is positioned such that the light emitting source 1 projects a light beam to the reflective target of the rotating reciprocating object. The rotating object can be a rotating plate, a rotating shaft, or other comparable or reciprocating item in different embodiments of the present invention. Next, the light emitting source 1 is activated so that the light beam is directed towards the reflective target. Upon contacting the reflective target, the light beam reflects towards the light sensitive receiver 2. The reflected light beam then passes through the optical bandpass filter 9 and then into the light sensitive receiver 2. As a result, the pulse conditioning circuit 3 is triggered. The output signal from the pulse conditioning circuit 3 is then passed onto the stroboscope circuit 4 so that the stroboscope light source 6 is triggered accordingly. When the stroboscope light source 6 is flashed, the blanking circuit 5 ensures that the stroboscope circuit 4 is not re-triggered from the emitted light from the stroboscope light source 6 for the duration of the flash and some delay time thereafter. More specifically, the stroboscope circuit 4 and the stroboscope light source 6 can only be re-triggered when the time delay introduced by the blanking circuit 5 expires. If the light emitting source 1 needs to be projected at a different angle from the stroboscope light source 6, the remote base 12 is used. More specifically, the module housing 11 is removed from the stroboscope body 17 and mounted onto the remote base 12. The remote base 12 is placed as needed and then electronically connected to the stroboscope light source 6 and stroboscope circuit 4 by tethering through the signal transmission cable 13.

Although the invention has been explained in relation to its preferred embodiment, it is to be understood that many other possible modifications and variations can be made without departing from the spirit and scope of the invention as hereinafter claimed.

What is claimed is:

1. A stroboscope with an integral optical reflective sensor used as a flash trigger comprising:
    a light emitting source;
    a light sensitive receiver;
    a pulse conditioning circuit;
    a stroboscope circuit;
    a blanking circuit;
    a stroboscope light source;
    the light emitting source being positioned adjacent and coplanar to the light sensitive receiver;
    the light sensitive receiver being electronically connected to the pulse conditioning circuit;
    the pulse conditioning circuit being electronically connected to the stroboscope circuit;
    the stroboscope circuit being electronically connected to the blanking circuit;
    the stroboscope circuit being electronically connected to the stroboscope light source;
    an optical block;
    an emitter aperture;
    a receiving aperture;
    the light emitting source and the light sensitive receiver being mounted within the optical block;
    the emitter aperture traversing out of the optical block;
    the emitter aperture being coplanar and adjacent to the light emitting source;
    the receiver aperture traversing into the optical block; and
    the receiving aperture being coplanar and adjacent to the light sensitive receiver.

2. The stroboscope with an integral optical reflective sensor used as a flash trigger as claimed in claim 1 further comprising:
    an optical bandpass filter;
    the optical bandpass filter being mounted adjacent to the light sensitive receiver; and
    the optical bandpass filter being in optical communication with the light sensitive receiver.

3. The stroboscope with an integral optical reflective sensor used as a flash trigger as claimed in claim 1 further comprising:
    a module housing;
    a stroboscope body;
    the light emitting source, the light sensitive receiver, and the pulse conditioning circuit being mounted within the module housing; and
    the module housing being mounted onto the stroboscope body.

4. The stroboscope with an integral optical reflective sensor used as a flash trigger as claimed in claim 3 comprising:
    the module housing being peripherally positioned to the stroboscope body; and
    the module housing being removably attached to the stroboscope body.

5. The stroboscope with an integral optical reflective sensor used as a flash trigger as claimed in claim 3 comprising:
the module housing being peripherally positioned to the stroboscope body; and
the module housing being fixed to the stroboscope body.

6. The stroboscope with an integral optical reflective sensor used as a flash trigger as claimed in claim 3 comprising:
the module housing being centrally positioned to the stroboscope body; and
the module housing being fixed to the stroboscope body.

7. The stroboscope with an integral optical reflective sensor used as a flash trigger as claimed in claim 3 further comprising:
an electronic terminal;
a mating connector;
the electronic terminal being mounted into the module housing;
the mating connecter being externally positioned from the module housing; and
the stroboscope circuit being electronically connected to the electronic terminal via the mating connector.

8. The stroboscope with an integral optical reflective sensor used as a flash trigger as claimed in claim 7, wherein the electronic terminal is a compression connector.

9. The stroboscope with an integral optical reflective sensor used as a flash trigger as claimed in claim 3 further comprising:
a remote base;
a signal buffer circuit;
a signal transmission cable;
the module housing being mounted onto the remote base;
the remote base being tethered to the stroboscope light source and stroboscope body through the signal buffer circuit; and
the pulse conditioning circuit being electronically connected to the stroboscope circuit by the signal transmission cable.

10. The stroboscope with an integral optical reflective sensor used as a flash trigger as claimed in claim 1, wherein the light emitting source is a light emitting diode (LED).

11. The stroboscope with an integral optical reflective sensor used as a flash trigger as claimed in claim 1 further wherein the light emitting source is a laser beam.

12. The stroboscope with an integral optical reflective sensor used as a flash trigger as claimed in claim 1 wherein the light sensitive receiver is a phototransistor.

13. The stroboscope with an integral optical reflective sensor used as a flash trigger as claimed in claim 1 further wherein the light sensitive receiver is a photodiode.

14. The stroboscope with an integral optical reflective sensor used as a flash trigger as claimed in claim 1 wherein the stroboscope light source is a LED array.

* * * * *